United States Patent [19]

Porter

[11] 4,005,958
[45] Feb. 1, 1977

[54] APPARATUS FOR CONTINUOUS PRODUCTION OF RECTANGULAR CROSS-SECTIONED FOAMED PLASTIC BUNSTOCK

[75] Inventor: Lawrence C. Porter, Palos Verdes Penninsula, Calif.

[73] Assignee: The Upjohn Company, Kalamazoo, Mich.

[22] Filed: Mar. 21, 1975

[21] Appl. No.: 560,713

Related U.S. Application Data

[62] Division of Ser. No. 381,923, July 23, 1973, Pat. No. 3,887,670.

[52] U.S. Cl. .................................. 425/89; 425/224; 425/329; 425/449; 425/817 C
[51] Int. Cl.² ......................................... B29D 27/04
[58] Field of Search ............... 425/4 C, 817 C, 115, 425/224, 329, 447, 449, 371, 471, 89; 264/45.4, 45.8, 46.2, 46.3, 48, 51, 52, 54; 156/78, 79

[56] References Cited

UNITED STATES PATENTS

| | | | |
|---|---|---|---|
| 2,404,582 | 7/1946 | Bosomworth | 425/224 |
| 3,488,800 | 1/1970 | Kornylak | 425/4 C |
| 3,496,596 | 2/1970 | Buff | 425/4 C |
| 3,659,981 | 5/1972 | Ferstenberg | 425/4 C X |
| 3,734,668 | 5/1973 | Porter | 425/4 C X |
| 3,832,099 | 8/1974 | Berg | 425/4 C |

*Primary Examiner*—Francis S. Husar
*Assistant Examiner*—Mark Rosenbaum
*Attorney, Agent, or Firm*—St. Onge Mayers Steward & Reens

[57] ABSTRACT

Apparatus and method are described for improved production of foamed bunstock in continuous length. A generally U-shaped moving mold is utilized within which a thermosetting foam mix is deposited and the bunstock is then formed as a continuous block. This moving mold is configured along a critical portion of its length to conform as closely as practical to the inverted mirror image of the profile defined by the characteristic curve of percent of foam rise as a function of time for any selected foam mix composition. A weir arrangement is employed to control the travel of foam mix while this is still highly liquid. The objective is to maintain a condition of hydrostatic balance throughout the body of developing foam from the point of mix lay down to the point of foam gellation. Features of the invention reside in the concept of and means for changing the weir configuration and mold profile to achieve that condition of operation in which various forces acting on and in the developing foam mix produce the aforesaid hydrostatic equilibrium. By so doing greater flexibility is achieved in terms of ability to adapt a given production installation to handle different foam compositions, production rates, bunstock dimensions and shapes, with better uniformity of foam density and cell isotropicity than heretofore commercially practical.

14 Claims, 12 Drawing Figures

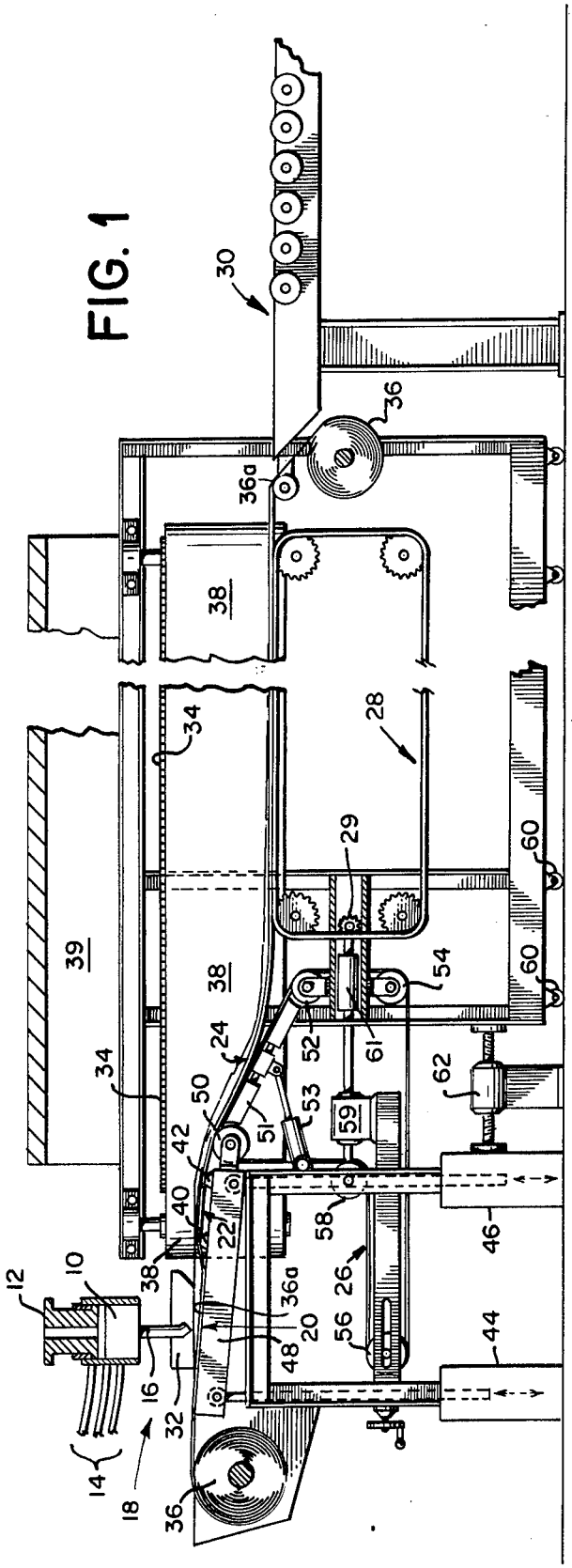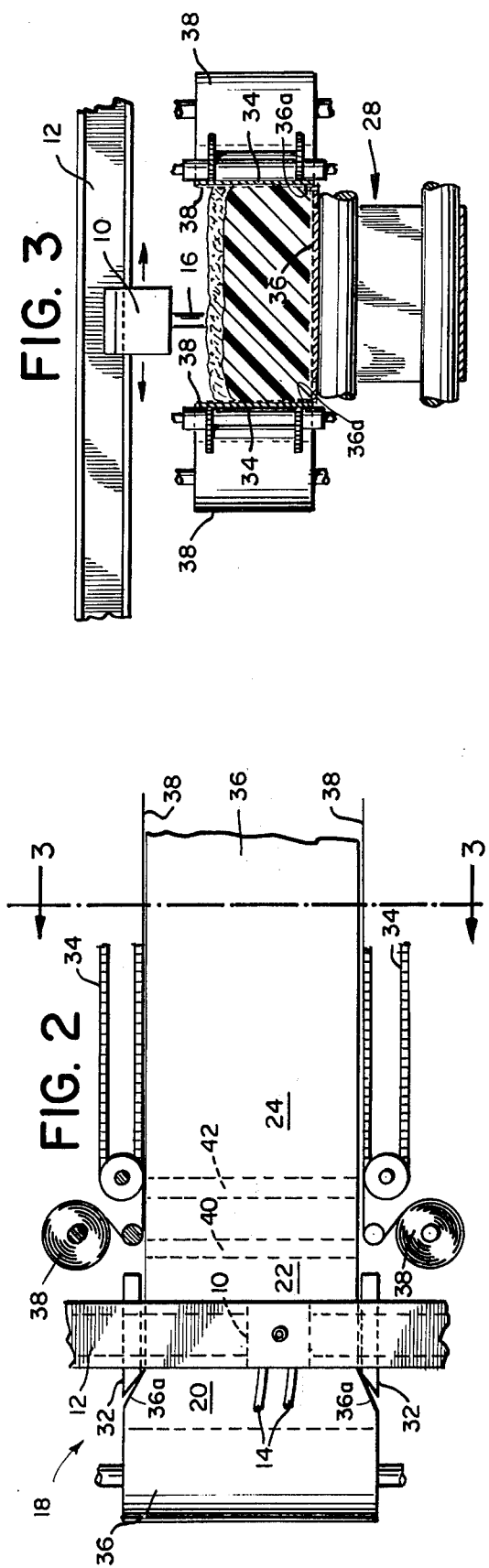

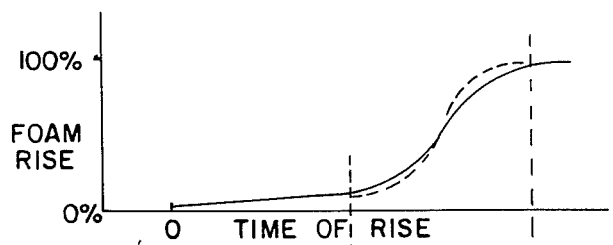
FIG. 4
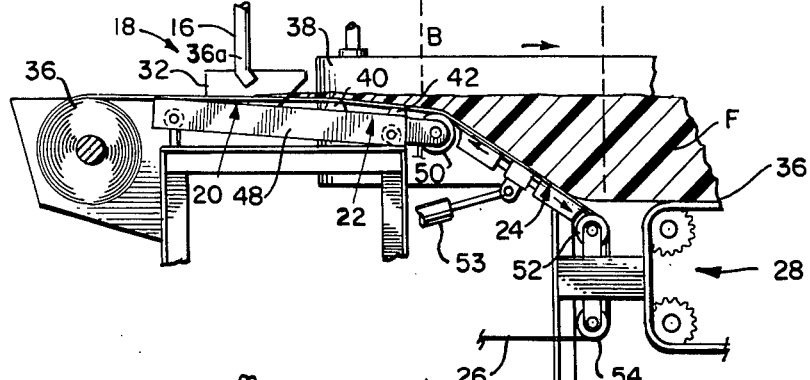
FIG. 5
FIG. 6
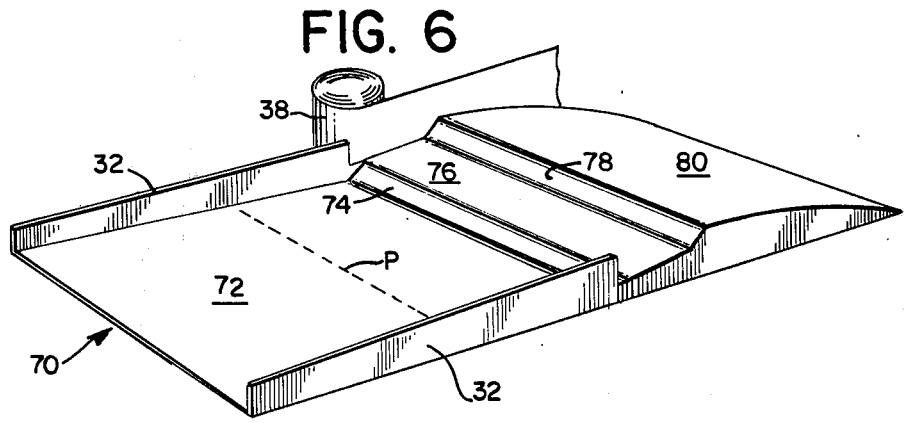

APPARATUS FOR CONTINUOUS PRODUCTION OF RECTANGULAR CROSS-SECTIONED FOAMED PLASTIC BUNSTOCK

This is a division of application Ser. No. 381,923, filed July 23, 1973, now U.S. Pat. No. 3,887,670.

BACKGROUND OF THE INVENTION

This invention relates to casting of continuous length foamed bunstock from a thermosetting fluid mix, more especially polymeric isocyanates such as polyurethane foams, but is likewise applicable to other expandable, thermosetting foam mixes. The invention relates in particular to improvements in apparatus for and method of manufacturing such foam product of improved density gradient and cell isotropicity.

Foamed plastic bunstock is used extensively in the manufacture of bedding (mattresses, pillows), furniture and automotive upholstery, thermal and sound insulation, and the like. Selfgassing polyurethane mixes are currently used predominantly. For many of these applications it is not practical to mold or cast the polyurethane foam directly in its desired final shape or form, especially, where physical characteristics of maximum uniformity of density, resiliency and the like are important. Usually it is more economical, and sometimes it is unavoidably necessary from a practical standpoint, to produce the product in large cast buns or billets of standard modular dimension, and then cut these into sections of desired shape. Bun molding has been commercially practiced for some time, both on a batch or individual bun-forming basis, and more recently in a continuous process wherein the foam mix is deposited in a moving mold to produce a bun of uninterrupted in length. This is then sawed, sliced, etc., into appropriate lengths for ultimate product fabrication, as well as interim convenience of handling, shipping and storing.

In order to avoid waste in converting the ascast product to its final shape, one of the important considerations is to obtain a bun that has a flat top or minimum cresting or "bread-load" configuration; in other words, is of nearly rectangular cross section as possible. This "bread-loafing" effect is a characteristic result of methods heretofore used in producing buns. Obviously if there is a substantial crest or hump in the top surface of the bun as produced, there will be a significant scrap loss upon skiving or cutting the billet into slabs to get flat, parallel surfaces. Since the foamed plastic generally has a relatively high unit value and since commercial production of the foam runs in the millions of pounds annually, any substantial scrap loss aggravates the cost of the finished product.

If there are splits, voids, bubbles and other discontinuities in the body of the foam stock, which has also been a common difficulty, portions of the foam block containing these must be cut out, thus producing further scrap loss. Additionally, nonisotropic cellular formation in the stock impairs the physical properties of the finished product, so a high degree of uniformity in the shape and size and axis orientation of the foam cells produced is accordingly desirable.

Although it might appear to be an easy solution, for ensuring a dimensionally uniform product, simply to confine the developing foam by suitable fixed molding or shaping means, this is not in fact, readily accomplished, especially in practical commercial practice involving production of as much as several million pounds of product monthly in a single plant. During the development of the foam several actions and reactions take place simultaneously, and in some cases competitively. That is, there is generation of a gas to produce the foamed cellular properties, and at the same time there is a polymerization reaction taking place, leading to gellation or rigidification of the walls of the cells to impart the desired degree of resiliency and body in the product.

Prior attempts to produce foamed bunstock in a continuous manner generally involve depositing a reactive foam mix on a lower conveyor surface, such as a continuous paper web drawn over a stationary bed or pour board. Side restraints are also used to complement the lower surface, forming a U-shaped mold, looked at in cross section, of extended length. See for example U.S. Pat. No. 3,152,361. In order to get a finished foam bun of uniformly rectangular cross section, smoothing or "ironing" belts, aprons, rollers and the like have been applied to the surface of the advancing foam during its development. Examples of this are seen in U.S. Pat. Nos. 3,123,856, 3,553,300 and 3,655,311. This results in a tendency towards densification or compacting of the product, particularly at its upper surface, which is undesirable and this non-specification portion must usually be cut off an discarded.

To get around this, other attempts have been made to produce continuous flap top bunstock without any vertical confinement, using synchronously moving side conveyors complementing the lower conveyor surface and exerting a lateral effect on the developing foam bun. Some of these systems are quite complicated mechanically and troublesome to adjust and maintain. See for example U.S. Pat. Nos. 3,091,811 and 3,719,734; also British patent Nos. 1,225,968 and 1,235,915.

Potentially, what appeared for a while to be one of the more promising developments in continuous foamed bunstock production was a so-called upside-down process in which the lower conveyor element forming the bottom of the moving U-shaped mold is trained to move downward, relative to horizontal side elements, during that portion of the run where the maximum expansion occurs. The desired objective was to keep the upper surface of the developing foam at a substantially constant, horizontal level, while allowing the body of the foam to expand downwardly to meet the declining portion of the conveyor run. Typical examples of this approach are seen in U.S. Pat. Nos. 3,325,823 and 3,560,599. It is postulated that by causing the bottom of conveyor to descend relative to fixed side wall elements, there is a reduction of the frictional restraint at the interface of the foam stock and side conveyor elements, and that this would reduce the tendency to form a relatively large radius in the bunstock at the intersection of the side and top surfaces. Unfortunately this prior teaching has not afforded a practical solution on account of both technological and economic problems with the proposals advanced. As a result, the industry has turned to those mechanically more complex systems of attempting to provide side lifting arrangements for the developing foam, as for instance those shown in U.S. Pat. No. 3,719,734 and the British patents mentioned above. Not only is there substantial equipment expense and added maintenance involved, there must also be a willingness to compromise on the quality of the product obtained. For example, so-called "tin splits" can become critical, forcing an operator to resort to mix compositions that are not as favorable from the standpoint of foam resiliency, sag resistance, thermal properties or uniform density. There is the further disadvantage in that a given installation does not have much latitude or flexibility to permit use of different foam mix compositions, rates of production or ambient operating conditions from those for which the equipment was specifically designed.

Another area of difficulty encountered in prior systems has been that of preventing washback or undercutting of the developing foam on the pour board. This problem arises in part by uneven distribution in the advancing foam mix of portions of substantially different "age"; that is, portions of the liquid mix deposited on the conveyor at materially different times. The usual manner of depositing the mix on the moving conveyor is to transverse a mixing head back and forth across the width of the conveyor, laying down a zig-zag path of the mix on the advancing conveyor web. If the mixing head traverse rate is not properly coordinated with the throughput rate of liquid mix, the conveyor speed and the pitch of the pour board beneath the mixing head, substantial deviation may arise in average age of the liquid mix in any transverse section taken along the pour board downstream of the mixing head. Additional problems arise from portions of the mix, which have begun to foam, floating backwards against the direction of conveyor travel, while unreacted (non-foaming) portions of the liquid are carried forward and mixed with other portions downstream in which the foaming reaction has already progressed much further.

SUMMARY OF THE INVENTION

Generally speaking the invention provides apparatus for producing foamed plastic bunstock that will permit a flexibility of operating parameters not afforded by prior developments in this art.

The inventive concept is directed toward making possible, under practical large scale production conditions, the achieving of a set of operating conditions which is adjustable to match the rise characteristics of any selected foam mix composition, whereby a body or pool of liquid and semi-liquid mix is maintained in a state of hydrostatic balance between the mixing head and the point where gellation finally occurs.

This result is obtained by apparatus which incorporates means for adjustment, as presently more fully discussed, such that for any given set of operating conditions (e.g., mix composition, throughout, bunstock size, shape, component temperature condition, etc.) the moving mold can be set to provide a receptacle for the foam mix whose configuration lengthwise of the mold formed by the advancing conveyor closely approximates the inverted mirror image of the rise profile of the selected foam mix under the given operating conditions. It is a further feature of the invention that changes in mold configuration provided by the conveyor may be introduced without interruption of production by making small but reasonable incremental changes both in formulation and in apparatus. Changes in formulation can be controlled by a system such as that described in the previously mentioned U. S. Pat. No. 3,655,311, while the means of effecting physical adjustment of apparatus to compensate for such changes is the subject of this invention. Practically this is accomplished by apparatus for, and a method of, making one or more adjustments which characteristically include:

a. Providing a pour board, including upstream, intermediate, and downstream sections, the latter hereinafter called the "surfboard" portion for convenience of nomenclature. These various sections are adjustably inclinable in relation to complementary side elements of a moving U-shaped mold, to provide a path which descends at different rates or slopes in the direction of foam travel. Means is also incorporated for increasing and decreasing the length of the surfboard and changing its surface contour; and b. Providing damming or weir means which extend across the pour board at selectively adjustable positions upstream of the surfboard, whose height and configuration, both longitudinally and transversely, are also selectively adjustable.

The characteristizing novel features just mentioned are preferably used in combination, but some benefits of the invention will be obtained by individual use of them, as will apparent hereinafter. Other, conventional adjustment capabilities include conveyor speed, longitudinal and vertical positioning of the mixing head, and rate of traverse of the mixing head.

The invention is illustrated more specifically with reference to the accompanying drawings in which:

FIG. 1 is a side elevational view of a conveyor system for continuous production of polyurethane foam bunstock;

FIG. 2 is a top plan view of a portion of the apparatus shown in FIG. 1;

FIG. 3 is a cross sectional view taken on line 3—3 of FIG. 2;

FIG. 4 is a schematic drawing showing the relative relationship between the characteristic rise curve of a typical polyurethane foam mix and corresponding positions on the apparatus where the rising foam characteristics are encountered;

FIG. 5 is an enlarged cross sectional view, schematically depicting a portion of the pour board with rising foam thereon;

FIG. 6 is a perspective view of an integrated pour board unit;

Figure 7:
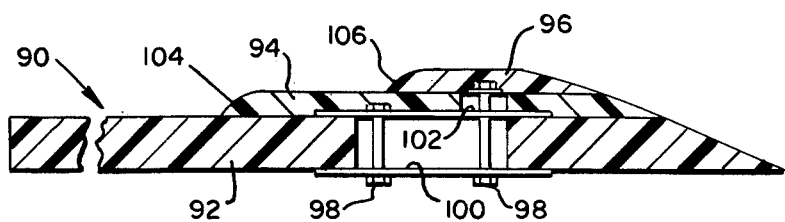
FIGS. 7 and 8 are sectional views in side elevation of modified pour board arrangements useful in the apparatus.

The apparatus in FIG. 1 of the drawings illustrates one manner of incorporating the inventive concept in a practical machine.

Mixing head 10 is suitably suspended from bridge 12 to permit it to be moved back and forth across the width of the bun-forming line by any suitable power means (not shown). Liquid components of the foam mix are delivered under pressure to mixing head 10 through flexible hoses 14, and the liquid mix is distributed by pour spout 16 of the head. Means for proportioning and premixing the multiple components of a typical commercial polyurethane mix are described in U.S. Pat. No. 3,655,311, previously mentioned. Spout 16 delivers a stream of the mix onto a continuously advancing paper web (more fully described below) which is traveled over a composite pour board, indicated generally at 18, whose upstream section provides a flat surface 20 beneath mixing head 10, which leads into a contoured intermediate section 22. This later section leads in turn to the "surfboard" section 24, referred to above, provided by a portion of the run of an endless conveyor 26. A main conveyor 28, consisting of an endless blet or series of transverse slats, is disposed to provide a substantially horizontal run extending from the lower end of surfboard 24 to carry off and/or storage conveyor 30. Side conveyors 34, each carrying a continuous web of paper or similar sheet stock 38, are disposed vertically at the side edges of the surfboard and main conveyor. A tunnel 39 of conventional type encloses the bun line throughout much of the zone where the bun is developed.

The several pour board and conveyor sections just described provide a lower supporting surface forming part of a U-shaped moving mold in which the foamed bunstock is cast and allowed to develop. The sides or legs of the U-shaped molds are provided at the upstream end of the apparaus by a pair of side rails 32 which laterally flank the upstream portion 22 of the pour board. Conveyors 34 serve as continuations of the side rails 32. Sheet stock 36 is trained over the respective pour board and main conveyor surfaces, and similar webs 38 are disposed along opposite side conveyors 34, to form the moving U-shaped mold by which the foamed product is actually carried until developed. As seen more especially in FIG. 2, web 36 forming the bottom element of the mold is folded marginally upwardly by rails 32 as it is fed off its supply roll onto the pour board, and thus forms a shallow trough in the region in which the liquid mix is first deposited by the mixing head 10. These folded margins meet with the side sheets 36 in the region of the intermediate portion 22 of the pour board, and are brought into face-to-face contact with side sheets 36 which thereafter serve as the moving side walls of the bunstock mold.

The product is delivered to carry-off conveyor 30 in continuous form as a generally rectangular block which is sawed into appropriate lengths for subsequent fabrication into finished products. Prior to this the bottom and side webs 36, 38 may be stripped from the bunstock.

Referring now more specifically to the schematic illustration in FIG. 4, a plot is made of the characteristic rise profile of a selected polyurethane foam mix against a time axis, and direct comparison of this is made with longitudinal positions on the foam line, shown schematically beneath the plot. As discussed above, bottom sheet 36 is pulled over the contoured surface of the pour board section of the bun line, and the fluid resin mix is deposited on this sheet from pour spout 16. This corresponds to zero time on the foam rise plot. At this point the pour board surface 20 is typically disposed at a small angle of declination to the horizontal, commonly from 2° to 4°, which helps to prevent floatback of developing foam, contra to the conveyor travel. As the liquid mix is carried forward onto intermediate section 22 of the pour board, reaction taking place within the mix causes a transition to occur from an all-liquid phase system to a mixed liquid-gas system. This phase change is readily observable and is conventionally referred to as the "cream line" although it will in fact usually be a zone rather than a sharply defined line of demarcation. It has been found important to stabilize the position of this cream line longitudinally of the pour board, otherwise there will be a tendency for the formation of voids or other discontinuities in the body of the finally developed foam. Depending on the method of fluid mix lay down and distribution, wave action will develop in the pool of liquid deposited on the pour board, which will give rise to a poorly defined cream line, leading to channelling or selective undercutting wherein unreacted liquid is interspersed with the foam arriving on the surfboard.

In order to give better control of the position and form of cream line, the invention includes providing damming formations or weirs in the intermediate section 22 of the pour board. In the particular illustration in FIG. 5, a multiple stage weir 41 is schematically depicted whose contour, length and height will depend on operating conditions, such as rate of throughput, conveyor speed, pour board angle and particular mix composition. More on this will be discussed hereinafter.

With the initiation of gassing, as evidenced by the appearance of the cream line, the volume of the liquid mix begins to expand significantly. This expanding condition is represented by the increased slope in the profile of the foam rise curve, and continues until the mix becomes sufficiently gelled or polymerized to be at least self-supporting. This slope may be relatively constant, as in the solid line showing, or it may be curvilinear, as in the dotted line showing. In order to accommodate this volumetric increase, the surfboard section 24 of the pour board is tilted down from the horizontal at an increased angle, and provision may also included for changing its contour, so that the volume of the mold defined by section 24 and the side walls increases in direct proportion to the increase in foam volume as it progresses through this section of the conveyor. Thus the upper surface of the foam is maintained substantially horizonal from the breakover point B, just downstream of weir 41, throughout the rest of the travel of the foam. By this means, a hydrostatically balanced condition is maintained in the pool of developing foam on the pour board-surfboard configuration between point B and until gellation occurs, and the foam simply lies in the mold provided for it. Under such condition there is no requirement for flow to take place in the developing foam from one section or region of the foam body toward some other section or region which has been temporarily depleted. Such depletion is usually caused by adhesion of the foam to the side webs 38 under those conditions where the declination of surfboard 24 produces a mold volume change that is not equal to the change taking place in the foam body itself at corresponding points along the conveyor. This situation will prevail under any operating condition other than one unique condition in a system of fixed position. That one unique condition will of course be determined by all of the variables involved, including polymer composition, temperatures, rates of throughout at the mixing hand, conveyor speed, physical lengths and pitch angles of the pour board-surfboard configuration, and bun size.

Since each particular set of operating conditions will produce different instantaneous conditions in the developing foam in the period between initial laydown and final gellation, the pour board and surfboard configurations must be made adjustable if this hydrostatically balanced condition is to be achieved. The present invention is directed more particularly to practical means for accomplishing this.

Referring again to FIGS. 1 and 2, the angle of declination in the initial section of the pour board at the point of fluid mix laydown is adjusted by suitable jack means 44, 46 at the rearward and forward ends of a platform 48 on which the upstream and intermediate sections 20, 22 of the pour board are supported. Typically this angle is about 2° to 4° to the horizontal, but can vary from a few degrees negative to as much as 7° positive. The terminal or surfboard portion 24 of the pour board is formed by an endless belt conveyor which is trained over a series of rolls 50, 52, 54 and 56. Roll 50 locates the upper end of surfboard immediately contiguous to the breakover point, corresponding to point B in FIGS. 4 and 5, at the end of the intermediate portion 22 of the pour board, while roll 52 determines the lower end of the surfboard 24. It will be noted that roll 50 is journalled on platform 48, while roll 52 is journalled on the framework of the main conveyor 28. A telescoping platform 51 bridges the distance between rollers 50 and 52, and is pivotally attached at its opposite ends to frame members to provide support for conveyor belt 26. Thus the angle of declination of surfboard 24 can be changed by raising or lowering platform 48, while the length of surfboard 24 can be changed by moving main converyor 28 toward or away from the first portion of the apparatus. For this reason, main conveyor 28 is supported on rollers 60 and a screw jack 62 is interposed between the conveyor frame and the support for the pour board platform. Roll 56 is a take-up roll to allow for increase or decrease in the length of surfboard 24, while roll 58 serves as a driving roll for imparting forward motion to the conveyor belt from a driving source 59. The latter is used also to supply driving power to main conveyor 28 through sprocket 29, the driving connection including shafting and a differential transmission 61 to keep bottom web 36 synchronized with the travel of side webs 38 when screw jack 62 is actuated. If the contour of surfboard 24 is also to be adjustable, platform 51 is composed of articulatable sections, and a suitable fluid operated ram 53 or the equivalent are used to set the contour.

In addition to the control provided in the pour board configuration downstream of breakover point B, there are the damming weirs upstream of this point. As illustrated in FIGS. 1 and 2, weirs 40, 42 consist of slats disposed transversely of the conveyor in intermediate section 22 of the pour board. These weirs are adjustably mounted on this section of the pour board so that they can be individually or simultaneously moved upstream or downstream and fixed in selected position. The mounting of these weirs on the board also allows for changing their elevation above the pour board. Bottom web 36 is drawn over the weirs, forming spaced dams with a slight depression between them.

One of the major problems facing the operator of a continuous foam bun line is to coordinate the numerous variables confronting him to get a satisfactory product. Changes in chemical composition of the mix, as for example to eliminate splits in the bun, or to try to improve the flat top characteristics, may result in causing the natural position of the cream line to shift so radically that it goes beyond the breakover point. Liquid mix of a different age from other more mature surrounding mix will then exist on the surfboard section of the pour board. The resulting foam product will have non-uniform density, and isotropicity of the cell structure will likewise deteriorate. This difficulty of holding the cream line in proper position can be largely if not completely overcome by the provision of one or more weirs. At low throughput rates of the order of 100–200 pounds per minute, and at slow conveyor speeds, a single weir may be sufficient to stabilize the cream line for reasonable variations in such factors as mix composition, component temperature and mixing head traverse rates. Generally however a series of at least two weirs has been found much more satisfactory. With such an arrangement, the first weir acts like a "wave breaker", damping the oscillatory washing effect produced by the reciprocation of the mixing head in delivering the liquid mix. The dissipation of the wave action provided by the first weir is then supplemented by the next weir which helps to trap, temporarily, a pool of liquid between the weirs. Since their is some mild agitation or mixing action imparted to the liquid in the pool due to the drag effect of bottom web 36, the momentarily trapped increment of mix becomes more homogeneous in terms of average age. Furthermore, the tendency of the foam developing at this point to float back toward the mixing head is restrained, a problem encountered if a low pitch angle (under 3°) of the pour board is needed. The presence of a second, downstream weir is generally needed at production rates of 200–600 lbs/min. and at the higher pour board pitch angles (above 3°) to restrain the foam from flowing past the breakover point until it has aged and expanded sufficiently to be ready for release to the surfboard section.

In actual practice, the initial phase change in the mix producing the cream line phenomenon will appear as a band or zone of substantial width, as much as a foot or two in length for example, depending on mix formulation, conveyor speed, etc. Under typical operating conditions, adjustment is made to cause this cream line or zone to straddle an initial rise of the composite weir 41, as shown schematically in FIG. 5, while a second rise in the weir serves to hold the developing foam from sliding down the surfboard. The second rise will release the foam gradually as it expands and builds up a sufficient head above the weir. Through longitudinal placement of the weir, and adjustment of its height, the amount of hydrostatic head that must be developed by the foam before it passes the breakover point can be controlled to give the proper timing in respect to the rise configuration which it is desired to have take place on the subsequent surfboard section 24. When all conditions are properly set, a visual indication of this is evidenced by the fact that the level of the upper surface of the foam stays virtually flat and level, or parallel to the main conveyor, from the time it leaves the breakover point B to the end of the conveyor.

For many practical applications it is convenient to employ a pour board section 70 having weir elements integrally formed in its upper surface, such as the unit shown in FIG. 6, out of a slab of molded rigid foam stock to provide a flat upstream portion 72 which leads into a first riser 74, a step 76, a second riser 78 and a terminal portion 80.

This unit, when placed on platform 48 (FIG. 1) and provision made for shifting it forward or backward along the conveyor axis, can be designed to satisfy a family of mix formulations and production rates to meet most foam density and resiliency objectives. Such a unit provides for adjusting the distance between the pour point F on surface 72 and the first weir 74 to adapt the upstream portion of the pour board to rise profile changes or throughput changes, for example. Although this will also change the relative position of the second weir 78 and breakover position to the pour point, satisfactory operation can be achieved by proper selection of the height and spacing of the weirs, especially if correlation of the distance of the breakover position B to surfboard section 24 is made by shifting either or both unit 70 and mixing head 10. For flexible foam compositions of the common commercial density ranges, for example, of from around 1.2 to over 1.8 pounds per cubic foot, a weir height of about 1 ½ inches for each weir, and a spacing of about 2 feet between them gives excellent control for line capacities up to as much as 600 pounds per minute of foamed product.

Further refinement of the pour board configuration control is obtained by superimposing a number of foam slabs, or the equivalent, as illustrated in FIG. 7. The composite pour board section 90 there shown consists of a base layer 92 and superimposed layers 94, 96, each of shorter length than the other to provide a stepped configuration. Bolt and nut or other clamping means 98, passing through slots 100, 102 in the respective layers, permit longitudinal adjustment of the layers relative to each other, thereby enabling the spacing betwen the weirs 104, 106 to be changed.

Figure 8:
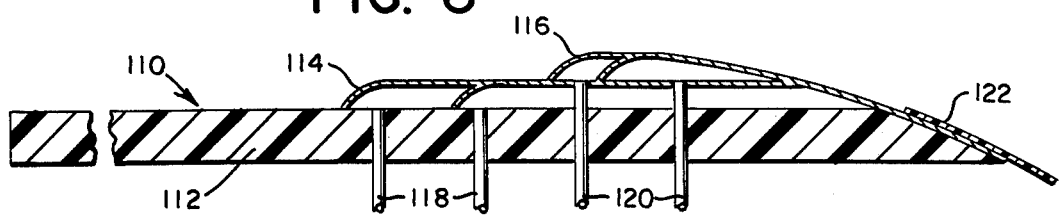

A further alternative is illustrated by unit 110 of FIG. 8, in which a base 112 has inflatable sections 114, 116 superimposed on it. Ducts 118, 120 lead to the interiors of the respective sections for communication to a source of fluid pressure which may be regulated to give more or less inflation of the sections. To provide some adjustment of weir spacing, each section 114, 116 is divided into compartments, each of which communicates through a respective duct 118 or 120 to the source of fluid pressure and may accordingly be individually inflated.

It is usually desirable to slope the weir faces in the direction of travel to conform more closely with the contour assumed by bottom web 36 when it is drawn over the surface of the pour board. Similarly, at the trailing end of the integrated pour board section, this is tapered to make a smooth, more gradual transition to the surfboard section. A flap 122 (FIG. 8) of flexible sheet plastic or fabric may also be secured to the tail of the unit to overlie the gap between this section and the surfboard portion, as a further means of providing a smoother transition at this point.

Prior approaches to continuous molding of bunstock, in which the product is as nearly rectangular in section as possible and yet has adequate isotropic cell structure to meet physical end-use specifications, have, as mentioned previously, been directed primarily to ways of manipulating or bodily moving the rising foam to physically compel it to assume a particular shape. Not only has the apparatus needed for this been machanically complex and expensive to house, build and maintain, the objectives of desired bun configuration and properties are inadequately obtained. By contrast, this invention is directed toward eliminating, to the extent possible, physical molding restraints imposed on the rising foam itself, relying almost exclusively on gravity. This is done by providing a mold configuration that can be tailored to the rise characteristics of the selected polymer mix while the apparatus is operating. There is thus provided the ability for a bunstock line operator to quickly achieve a state of balance between the volume increase occurring in the mix and the volume of the mold at any given cross section through the developing bun. That is, the developing foam is not itself required to do work, either in moving resiliently supported panels, aprons, conveyors, etc. to accommodate the expansion, or in shifting portions of the foam body to fill in voids left in other portions which develop because of non-coincidence of natural, unrestrained foam volume and volume of the mold at the instant such increment of foam resides in that section of the mold. This is the hydrostatically balanced condition spoken of earlier.

Figure 9:
FIGS. 9 through 12 are representative cross-sections of bunstock with typical imperfections encountered with prior production methods.

Physical evidence of the efficacy of the invention is provided by practical experience from experimental operation. Problems with bun shape configurations are correctible through employment of the invention, and without interruption of the production line. For example, formation of a bun having a cross section such as that represented in FIG. 9 is commonly due to too great a slope of the surfboard section of the pour board. Such undulated upper surface configuration will be observable in the foam as it passes over the surfboard while still in a semifluid state. Correction can be made by incrementally lowering the pour board platform, as by means of jacks 44, 46 seen in FIG. 1, to decrease the slope of surfboard 24. Conveyor speed is another parameter that can be manipulated to slow down the foam progress and thus bring the developing foam volume into balance wih the mold volume; but conveyor speed change alone cannot be used to rectify the situation completely, since this has side effects on cream line position, breakover point, and timing of the gellation point with respect to transition of the bun from the surfboard to the main conveyor. Adjustability of the surfboard contour and pitch thus provides a flexibility of control not encumbered by so many of the problems arising from conveyor speed of formulation change.

Figure 10:
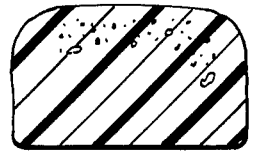

FIG. 18 represents a bun cross section typically encountered in which the "bread-loafing" effect spoken of earlier is apparent. This is again a probable indication of an unbalance between developing foam volume and mold volume (the latter being in this case too slow, i.e. the surfboard pitch being too low). FIG. 10 also illustrates discontinuities in the texture of the bun cross section, in the form of bubbles and voids. Another variant of the bubble problem is shown in FIG. 9 wherein lines of bubbles appear immediately below the troughs in the top of the bun. These bubbles are generally the result of nonuniformity in age condition of the foam mix. Conventional steps taken to correct for this condition have been to change conveyor speed and mix formulation. This is partially effective but usually introduces other problems. However, by adjusting the weir arrangement provided by this invention, much greater latitude in operation is made possible without encountering the difficulties of conveyor speed or formulation change.

Figure 11:
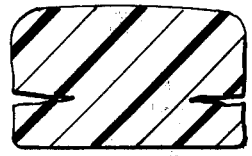

Still another problem is represented in FIG. 11 which illustrates a bun of good rectangular section but in which lateral splits appear. This condition usually indicates that the timing of the transition of the bunstock from the surfboard to the main conveyor is improperly coordinated with substantial completion of gellation in the bun. If transition occurs after gellation has occurred, the bending of the bunstock as it leaves the surfboard produces stresses resulting in such tears, since the stock has not developed sufficient strength at that point to resist the stress. To correct for this, conventional practice has been to speed up the conveyor slightly to get the bun off the surfboard before gellation is so nearly complete, or to change the catalyst ratio in the mix. Again, however, changing these parameters introduces other problems. Thus the capability of the invention apparatus to increase or decrease the length of the surfboard provides another capability for introducing a correction without affecting other parameters.

Figure 12:

FIG. 12 illustrates a bun of desirable flat top characteristic obtainable with proper surfboard configuration; but the presence of the bubble formation, indicating channeling of liquid and foam (i.e., incomplete homogenization) at a late stage in the development of the bun, seriously detracts from the marketability of the product. Use of proper weir arrangements as taught herein will generally eliminate this problem, without creating others. In fact, the weir arrangements of this invention may be used to good advantage in conventional foam lines, quite independently of the articulated surfboard portion of this invention. This is especially true when trying to operate conventional foam line equipment at higher throughputs, of the order of 500–600 pounds per minute of foam mix. At such rates so much liquid must be deposited that conveyor speeds up to around 30 feet per minute may be required, using steeper angles of conveyor declination, and long conveyor lengths between the pour point and cream line. Operation of conventional equipment under such conditions becomes very critical and the slightest upset in the process can result in a mess of foam-flooded equipment and expensive down-time and clean-up operations. Use of the weir arrangement of this invention affords a relatively simple means of alleviating some of the critically in such operations, giving significant improvement in the economic operation of conventional equipment.

The apparatus here shown for purposes of illustrating the invention is obviously capable of substantial modification within the scope of the concept disclosed. The particular surfboard conveyor arrangement shown is not critical in its detail, since other arrangements can be designed to perform the same functions. Other weir arrangements can likewise be employed, as for example weir configurations which are curved or slanted rather than rectilinear, as specifically shown. Such modification is of use in directing the flow of liquid mix into selected areas transversely of the conveyor to compensate for channeling or striation occurring naturally due to method of lay down of the mix. The weirs provide a means of introducing a correction for this at a point in the production of the bun where the material is still highly fluid, rather than by attempting to compensate for channeling at some later point through the use of adjustable mold sides, etc. At such time, the mix has undergone substantial increase in viscosity and tends to resist redistribution without adverse effect on the texture, etc., of the product.

The following claims are accordingly intended to comprehend all such changes and modifications which fall within the true scope and equivalency of the concept herein disclosed.

I claim:

1. Apparatus for producing longitudinally continuous foamed bun stock from a reactive liquid polymer mix to produce a bun of substantially rectangular cross-section, uniform density and cell isotropicity, which comprises conveyor means comprising a frame, a continuously advancing lower supporting portion and separate vertically disposed continuously advancing side portions associated with said lower portion, both said lower and side portions being supported on said frame to define an open-topped mold of generally U-shaped cross-section, and means driving said lower and side portions synchronously but independently along a path of travel defined by said frame;

means including said frame for supporting said lower conveyor portion to define a path of travel from a first to a second point on the path and disposing said conveyor portion at a slight declination in the direction of conveyor travel sufficient only to prevent float back of the developing foam thereon, including means on said frame for adjusting said supporting means to vary the declination of the path of travel between said first and second points;

means adjacent said conveyor for depositing said liquid polymer mix on said lower conveyor portion at said first point;

weir-forming means extending across said lower conveyor portion between said first and second points to elevate the surface of said lower conveyor portion as it is advanced thereover, said weir-forming means having provision for adjusting it longitudinally of the direction of conveyor travel and being of such low height only as to provide a shallow pool of liquid polymer mix across said conveyor upstream of said second point and avoiding build-up to a level which would produce any substantial hydrostatic head in the foam;

other means supporting said lower conveyor portion on said frame between said second point and a third point in its path of travel, including means operatively associated with said last named supporting means for adjusting said last-named supporting means to define a path of travel from said second to said third point which causes the surface of said lower conveyor portion to be shifted downwardly relative to said side conveyor portions along a line approximating the mirror image of the characteristic rise profile of the polymer mix during its interval of travel between said second and third additional means on said frame supporting said lower conveyor portion between said third point and a point of discharge of the finished bunstock.

2. Apparatus as defined in claim 1, which further includes means operatively associated with said weir-forming means for adjusting the height and position of said weir-forming means between said first and second points.

3. Apparatus as defined in claim 1, wherein said weir-forming means comprises at least two transverse members in spaced relation between said first and second points.

4. Apparatus as defined in claim 3, which further includes means operatively associated with said weir-forming means for adjusting the height and spacing of said weir-forming means relative to each other.

5. Apparatus as defined in claim 1, wherein said means supporting said lower conveyor surface between said first and second points comprises an integrated pour board section contoured in its upper surface to define a first planar area disposed beneath said means for depositing liquid polymer mix, and a second area elevated in respect to said first area and connected thereto by a step.

6. Apparatus as defined in claim 5, wherein said second area has at least two steps.

7. Apparatus as defined in claim 5, which includes means operatively associated with said pour board section for adjustably shifting said integrated pour board section along the path of conveyor travel.

8. Apparatus as defined in claim 1, wherein said means for adjusting said conveyor support between said second and third points includes means operatively associated with said conveyor support for changing the length and contour of said support.

9. Apparatus for producing longitudinally continuous foamed bunstock from a reactive liquid polymer mix to produce a bun of substantially rectangular cross-section, uniform density and cell isotropicity, which comprises conveyor means comprising a frame, a continuously advancing lower supporting portion and separate vertically disposed continuously advancing side portions associated with said lower portions, each of said portions being carried by said frame to define an open topped mold of U-shaped cross section, and means driving said lower and side portions synchronously but independently along a path of travel;

means including said frame for supporting said lower conveyor portion to define a path of travel from a first to a second point on the path and disposing said conveyor portion at a slight declination in the direction of conveyor travel sufficient only to prevent float back of developing foam thereon, including means for adjusting said supporting means to vary the declination of the path of travel between said first and second points;

means adjacent said conveyor for depositing said liquid mix on said lower conveyor portion at said first point;

weir-forming means extending across said lower conveyor portion between said first and second points to elevate the surface of said lower portion as it is advanced thereover, said weir-forming means having provision for adjusting its position longitudinally of the direction of conveyor travel and being of such low height only as to provide a shallow pool of liquid polymer mix across said conveyor upstream of said second point and avoiding build-up to a level which would produce any substantial hydrostatic head in the foam.

10. Apparatus as defined in claim 9, wherein said weir-forming means comprises at least two transverse members in spaced relation.

11. Apparatus as defined in claim 10, which further includes means operatively associated with said weir-forming means for adjusting the height and spacing of said weir-forming means relative to each other.

12. Apparatus as defined in claim 9, wherein said means supporting said lower conveyor surface between said first and second points comprises an integrated pour board section contoured in its upper surface to define a first planar area disposed beneath said means for depositing liquid mix, and a second area elevated in respect to said first area and connected thereto by a step.

13. Apparatus as defined in claim 12, wherein said second area has at least two levels and steps connecting them.

14. Apparatus as defined in claim 12, which includes means operatively associated with said pour board section for adjustably shifting said integrated pour board section along the path of conveyor travel.

* * * * *

UNITED STATES PATENT OFFICE
CERTIFICATE OF CORRECTION

Patent No. 4,005,958     Dated February 1, 1977

Inventor(s) Lawrence C. Porter

It is certified that error appears in the above-identified patent and that said Letters Patent are hereby corrected as shown below:

| | |
|---|---|
| Column 6, line 47: | Should read: |
| position | design |
| Column 6, line 51: | Should read: |
| hand | head |
| Column 8, line 60: | Should read: |
| point F | point P |
| Column 10, line 29: | Should read: |
| FIG. 18 | FIG. 10 |
| Column 12, Claim 1, line 38: | Should read: |
| third | third points; and |

Signed and Sealed this

Seventeenth Day of May 1977

[SEAL]

Attest:

RUTH C. MASON
Attesting Officer

C. MARSHALL DANN
Commissioner of Patents and Trademarks